United States Patent
Itou et al.

(10) Patent No.: US 11,251,499 B2
(45) Date of Patent: Feb. 15, 2022

(54) BATTERY COVER AND BATTERY PACK

(71) Applicant: Panasonic Intellectual Property Management Co., Ltd., Osaka (JP)

(72) Inventors: Kunihiko Itou, Osaka (JP); Yukiharu Wakiguchi, Osaka (JP); Eiji Saitou, Osaka (JP); Kazuhiko Miura, Kyoto (JP); Masahiro Mizuta, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/319,894

(22) PCT Filed: Jul. 5, 2017

(86) PCT No.: PCT/JP2017/024622
§ 371 (c)(1),
(2) Date: Jan. 23, 2019

(87) PCT Pub. No.: WO2018/025559
PCT Pub. Date: Feb. 8, 2018

(65) Prior Publication Data
US 2019/0267592 A1 Aug. 29, 2019

(30) Foreign Application Priority Data
Aug. 2, 2016 (JP) .............................. JP2016-151649
Apr. 19, 2017 (JP) .............................. JP2017-082752

(51) Int. Cl.
*H01M 50/383* (2021.01)
*H01M 50/30* (2021.01)
(Continued)

(52) U.S. Cl.
CPC ....... *H01M 50/383* (2021.01); *H01M 50/213* (2021.01); *H01M 50/35* (2021.01); *H01M 50/394* (2021.01); *H01M 50/107* (2021.01)

(58) Field of Classification Search
CPC combination set(s) only.
See application file for complete search history.

(56) References Cited

U.S. PATENT DOCUMENTS

| 2009/0197153 A1 | 8/2009 | Fujikawa et al. |
| 2010/0177507 A1 | 7/2010 | West et al. |

FOREIGN PATENT DOCUMENTS

| JP | 2006-228610 | 8/2006 |
| JP | 2007-027011 A | 2/2007 |

(Continued)

OTHER PUBLICATIONS

Sanyo, English translation of JP2010027523A, Feb. 4, 2010.*
(Continued)

*Primary Examiner* — Ula C Ruddock
*Assistant Examiner* — Sarika Gupta
(74) *Attorney, Agent, or Firm* — McDermott Will and Emery LLP

(57) ABSTRACT

A battery cover includes: a case for housing a battery; and a rib formed on an inner peripheral face of the case to form a first space between the inner peripheral face of the case and an outer peripheral face of the battery. The case has an air hole that communicates the inside and outside of the case, a first housing part for housing a positive electrode of the battery, and a second housing part for housing a negative electrode of the battery. The air hole is disposed in a position in the case closer to the second housing part than to the first housing part.

12 Claims, 8 Drawing Sheets

(51) Int. Cl.
    *H01M 50/35*     (2021.01)
    *H01M 50/213*     (2021.01)
    *H01M 50/107*     (2021.01)

(56) References Cited

FOREIGN PATENT DOCUMENTS

| | | | | |
|---|---|---|---|---|
| JP | 2009-212081 | | 9/2009 | |
| JP | 2010-027523 | | 2/2010 | |
| JP | 2010-055957 | A | 3/2010 | |
| JP | 2014150045 | A * | 8/2014 | ......... H01M 50/103 |
| JP | 2014-186944 | | 10/2014 | |
| JP | 2015-138773 | | 7/2015 | |

OTHER PUBLICATIONS

English translation of ROH SAE-WEON (JP2014150045A). (Year: 2014).*
Takeda, English translation of JP2014186944A, Oct. 2, 2014.*
International Search Report of PCT application No. PCT/JP2017/024622 dated Aug. 8, 2017.
The Extended European Search Report dated May 9, 2019 for the related European Patent Application No. 17836666.2.
English Translation of Chinese Office Action dated Feb. 2, 2021 for the related Chinese Patent Application No. 201780047510.6.
Communication pursuant to Article 94(3) EPC dated Aug. 6, 2021 for the related European Patent Application No. 17836666.2.

* cited by examiner

BATTERY COVER AND BATTERY PACK

CROSS-REFERENCE TO RELATED APPLICATIONS

This application is a U.S. national stage application of the PCT International Application No. PCT/JP2017/024622 filed on Jul. 5, 2017, which claims the benefit of foreign priority of Japanese patent applications No. 2017-082752 filed on Apr. 19, 2017 and No. 2016-151649 filed on Aug. 2, 2016, the contents all of which are incorporated herein by reference.

TECHNICAL FIELD

The present disclosure relates to a battery cover for housing a battery, and a battery pack including a plurality of battery covers housing batteries.

BACKGROUND ART

A repeatedly usable battery such as a secondary battery sometimes generates heat and the temperature of the battery becomes high (e.g., 100° C. or higher), due to excessive charging and discharging or an internal short-circuit, for example. Then, in the battery heated to an excessively high temperature, gas, flame, or the like may sometimes spurt (also referred to as "accidental explosion" below) to the outside from the inside of the battery.

A battery cover for housing a battery has been proposed to reduce influence to peripheral parts when such a situation occurs. This battery cover can suppress spreading, to peripheral parts, of gas, flame, or the like having spurted from the inside of a battery by an accidental explosion.

For example, PTL 1 discloses a battery cover provided with a filter part. This battery cover suppresses spreading of combustible materials contained in gas having spurted from a battery to the periphery of the battery cover, by absorbing the combustible materials with the filter part.

Meanwhile, PTL 2 discloses a battery cover provided with an air hole covered with a metal mesh member. This battery cover suppresses spreading of gas, flame, or the like having spurted from the inside of a battery to the periphery of the battery cover from the air hole, by absorbing the gas, flame, or the like by the mesh member.

CITATION LIST

Patent Literature

PTL 1: Unexamined Japanese Patent Publication No. 2006-228610
PTL 2: Unexamined Japanese Patent Publication No. 2009-212081

SUMMARY

The present disclosure provides a battery cover and a battery pack that can downsize a case, and can also reduce influence to peripheral parts when gas, flame, or the like spurts from the inside of a battery.

A battery cover of the present disclosure includes: a case for housing a battery and having an air hole that communicates an inside and an outside of the case, a first housing part for housing a positive electrode of the battery, and a second housing part for housing a negative electrode of the battery; and a rib formed on an inner peripheral face of the case to form a first space between the inner peripheral face of the case and an outer peripheral face of the battery. The air hole is disposed in a position in the case closer to the second housing part than to the first housing part.

A battery cover of the present disclosure can downsize a case, and can also reduce influence to peripheral parts when gas, flame, or the like spurts from the inside of a battery.

DESCRIPTION OF EMBODIMENTS

Knowledge Underlying the Present Disclosure

Figure 1:
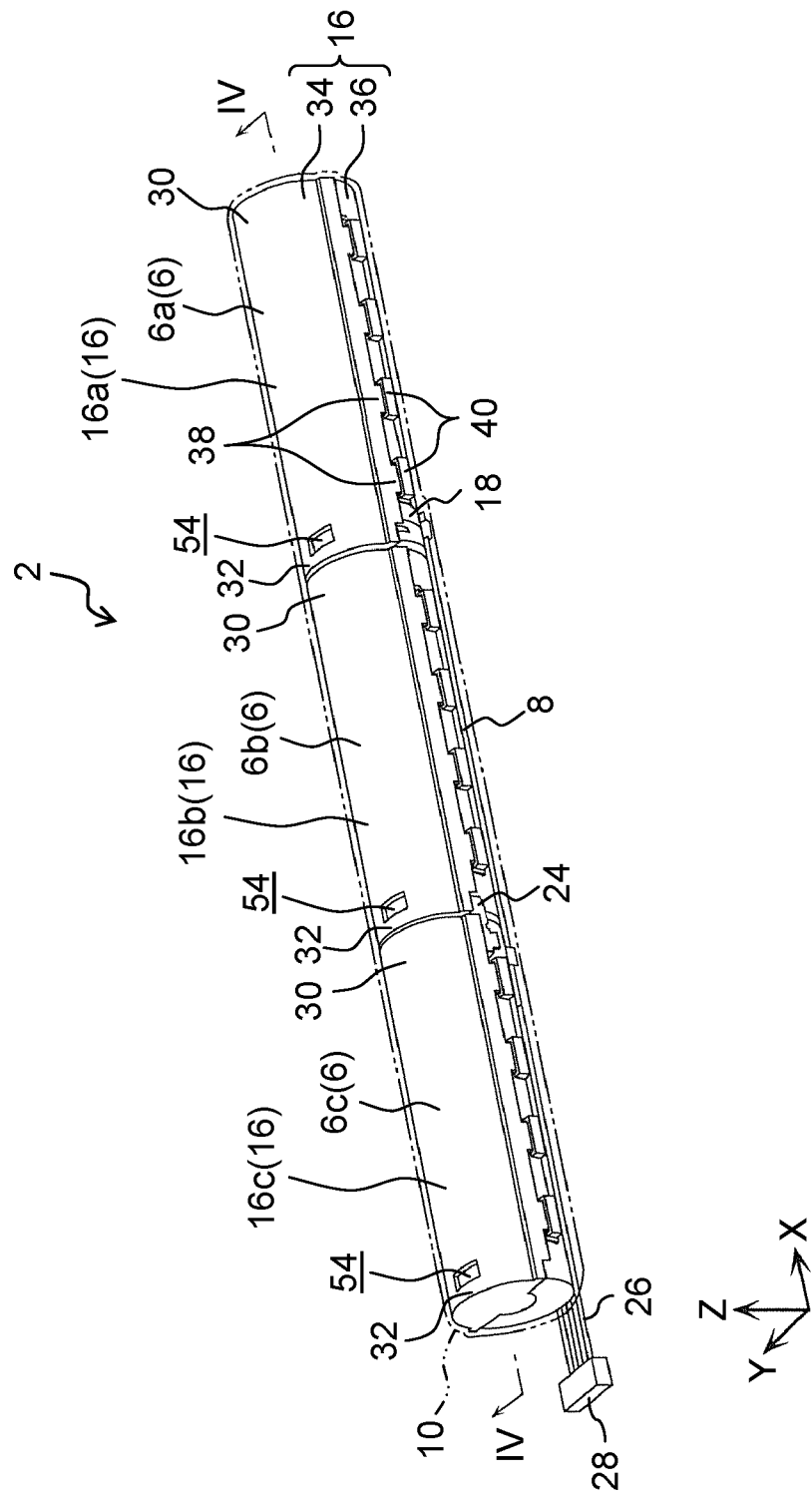
FIG. 1 is a perspective view schematically showing a configuration example of a battery pack of a first exemplary embodiment.

The inventors of the present application have identified problems described below with respect to the conventional technique.

In the battery cover disclosed in PTL 1, the filter part needs to be formed thick enough to enable the filter part to securely absorb combustible materials contained in gas, flame, or the like having spurted from the inside of the battery. For this reason, the battery cover has a problem that the thickness of the filter part enlarges the battery cover.

In the battery cover disclosed in PTL 2, the air hole is disposed in the vicinity of the positive electrode of the battery. In general, when a battery accidentally explodes due to excessive heating, gas, flame, or the like tends to spurt from the positive electrode (or the periphery of the positive electrode) of the battery. For this reason, when the air hole is disposed in the vicinity of the positive electrode of the battery, gas, flame, or the like having spurted from the positive electrode of the battery may spread through the air hole to the periphery of the battery cover, in the high-temperature state.

Exemplary Embodiments

Hereinafter, exemplary embodiments are described in detail with reference to the drawings as appropriate. Note, however, that descriptions in more detail than necessary may be omitted. For example, a detailed description of an already well-known matter and an overlapping description of substantially identical configurations may sometimes be omitted. This is to avoid unnecessarily redundancy in the following description, and to facilitate understanding by those skilled in the art.

Noted that the accompanying drawings and the following description are only presented to help those skilled in the art fully understand the present disclosure, and are not intended to limit the subject matter as described in the appended claims.

The drawings are not necessarily exact illustrations, but schematic views in which emphasis, omission, and proportion adjustment are made as required for illustration of the present disclosure, and these drawings may have shapes, positional relationships, and proportions that differ from actual shapes, actual positional relationships, and actual proportions. Further, in the drawings, substantially identical components are denoted by identical reference marks, and descriptions of those components may be omitted or simplified.

Exemplary embodiments of the present disclosure are hereinafter described with reference to FIGS. 1 to 9. Three axes, i.e., an X-axis, a Y-axis, and a Z-axis are shown in the drawings for use on an as needed basis in the following description of the exemplary embodiments. In these exemplary embodiments, for convenience' sake, a line parallel (substantially parallel) to a long side of battery pack 2 is taken as the X-axis, a line orthogonal to the X-axis on a plane parallel (substantially parallel) to a joint surface between upper case 34 and lower case 36 of battery cover 6 is taken as the Y-axis, and a line orthogonal to both the X-axis and the Y-axis is taken as the Z-axis. In addition, a direction in which positive electrode 12 of batteries 4a to 4c is disposed relative to negative electrode 14 of batteries 4a to 4c is defined as the positive X direction, and a direction in which batteries 4a to 4c are taken out from cases is defined as the positive Z direction.

First Exemplary Embodiment

A first exemplary embodiment is described below with reference to FIGS. 1 to 6.

[1-1. Configuration of Battery Pack]

First, a configuration of battery pack 2 according to the first exemplary embodiment is described with reference to FIGS. 1 to 4.

Figure 2:
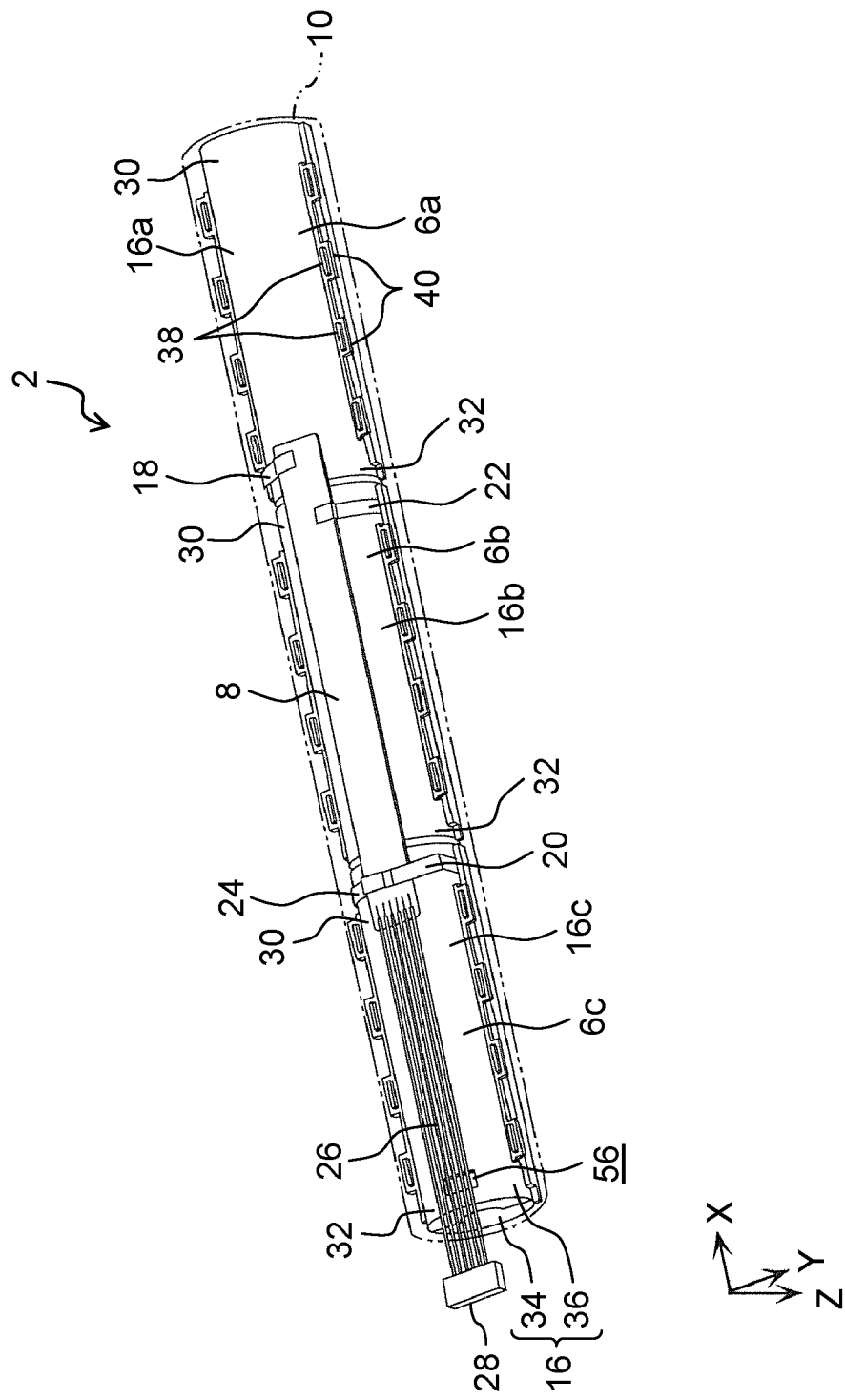
FIG. 2 is a perspective view schematically showing the configuration example of the battery pack of the first exemplary embodiment.

FIGS. 1 and 2 are perspective views schematically showing a configuration example of battery pack 2 of the first exemplary embodiment. Note that FIGS. 1 and 2 are perspective views of battery pack 2 viewed from different angles.

Figure 3:
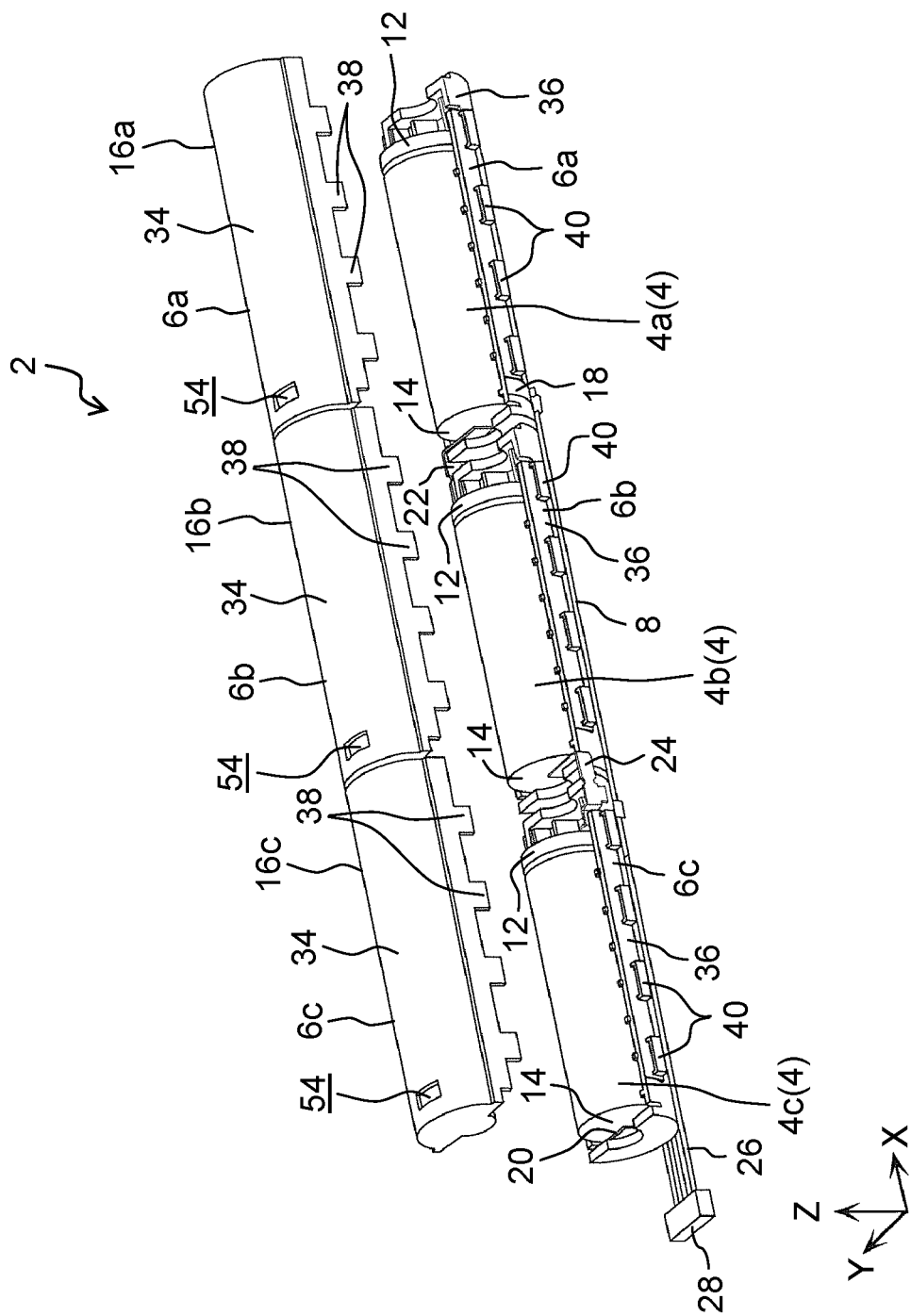
FIG. 3 is an exploded perspective view schematically showing the configuration example of the battery pack of the first exemplary embodiment.

FIG. 3 is an exploded perspective view schematically showing the configuration example of battery pack 2 of the first exemplary embodiment.

Figure 4:
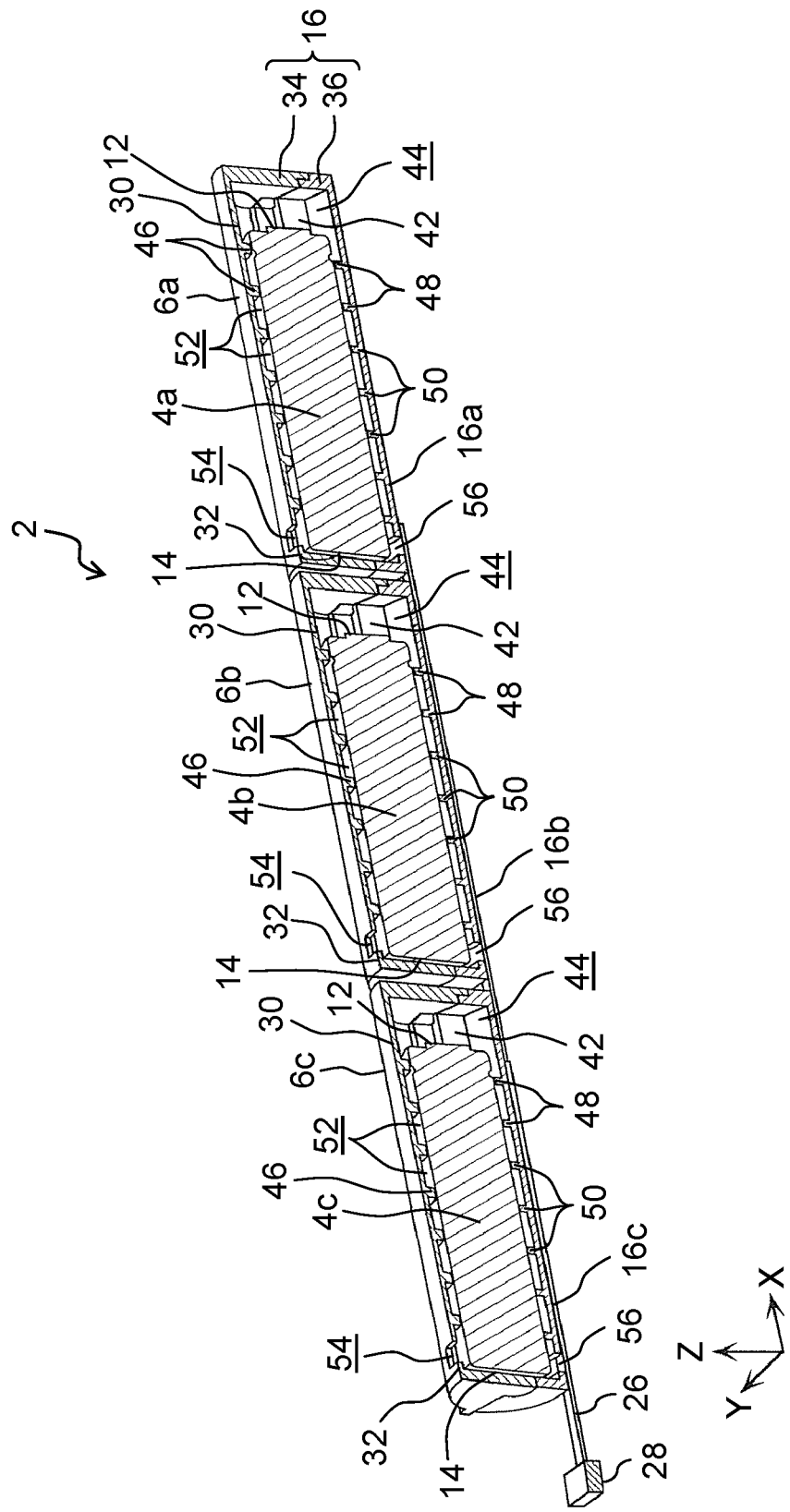
FIG. 4 is a cross-sectional perspective view schematically showing the configuration example of the battery pack of the first exemplary embodiment.

FIG. 4 is a cross-sectional perspective view schematically showing the configuration example of battery pack 2 of the first exemplary embodiment. FIG. 4 is a cross-sectional view of battery pack 2 illustrated in FIG. 1, which is taken along line IV-IV.

As exemplified in FIGS. 1 to 4, battery pack 2 includes a plurality of (e.g., three) batteries 4a, 4b, 4c (see FIGS. 3 and 4), a plurality of (e.g., three) battery covers 6a, 6b, 6c (see FIGS. 1. 3, and 4), safety unit 8 (see FIG. 2), and cover member 10 (see FIGS. 1 and 2). Battery pack 2 is installed in an electronic device (not shown) such as a portable television, and is used as a power source for driving the electronic device.

Batteries 4a to 4c have substantially the same configuration. Each of batteries 4a to 4c is a non-aqueous electrolyte secondary battery such as a lithium ion battery, but other types of batteries may be used. As exemplified in FIGS. 3 and 4, each of batteries 4a to 4c is formed into a substantially cylindrical shape. Positive electrode 12 is formed on one end (end on positive X direction side) of the long side (X-axis) of each of batteries 4a to 4c, and negative electrode 14 is formed on the other end (end on negative X direction side) of the long side of each of batteries 4a to 4c.

Battery cover 6a is a cover for housing battery 4a, battery cover 6b is a cover for housing battery 4b, and battery cover 6c is a cover for housing battery 4c. Battery covers 6a to 6c are disposed in series along the long side (X-axis) of battery pack 2, and are connected to one another, so that batteries 4a to 4c are electrically connected in series. As exemplified in FIGS. 1 to 4, battery cover 6a has case 16a, battery cover 6b has case 16b, and battery cover 6c has case 16c. Note that battery covers 6a to 6c have substantially the same structure, and cases 16a to 16c have substantially the same structure. Hence, in the following description, battery covers 6a to 6c are also collectively referred to as "battery cover 6", and cases 16a to 16c are also collectively referred to as "case 16" when the parts do not need to be described separately. Similarly, batteries 4a to 4c have substantially the same structure. Hence, batteries 4a to 4c are also collectively referred to as "battery 4", when the parts do not need to be described separately.

Case 16 is formed into a shape that corresponds to the shape of battery 4. Case 16 is formed into a substantially hollow cylindrical shape, for example. Case 16 is formed of an incombustible (self-extinguishing) resin such as polycarbonate, but may be formed of other incombustible materials. Battery 4a is housed in case 16a of battery cover 6a, battery 4b is housed in case 16b of battery cover 6b, and battery 4c is housed in case 16c of battery cover 6c. Note that case 16, and battery 4 housed in case 16 are electrically insulated from each other. The configuration of case 16 will be described later.

Battery cover 6a has positive lead plate 18 (see FIGS. 2 and 3). Positive lead plate 18 is an electrode plate for electrically connecting positive electrode 12 of battery 4a and safety unit 8. As exemplified in FIG. 3, an end of positive lead plate 18 is attached to positive electrode 12 of battery 4a by soldering or spot welding, for example, inside case 16a of battery cover 6a. As exemplified in FIG. 2, the other end of positive lead plate 18 is drawn out from case 16a of battery cover 6a, and is attached to safety unit 8 by soldering or spot welding, for example.

Battery cover 6c has negative lead plate 20 (see FIGS. 2 and 3). Negative lead plate 20 is an electrode plate for electrically connecting negative electrode 14 of battery 4c and safety unit 8. As exemplified in FIG. 3, an end of negative lead plate 20 is attached to negative electrode 14 of battery 4c by soldering or spot welding, for example, inside case 16c of battery cover 6c. As exemplified in FIG. 2, the other end of negative lead plate 20 is drawn out from case 16c of battery cover 6c, and is attached to safety unit 8 by soldering or spot welding, for example.

Battery cover 6b has middle lead plate 22 and middle lead plate 24 (see FIGS. 2 and 3). Middle lead plate 22 is an electrode plate for electrically connecting negative electrode 14 of battery 4a and positive electrode 12 of battery 4b. As exemplified in FIG. 3, an end of middle lead plate 22 is attached to negative electrode 14 of battery 4a by soldering or spot welding, for example, inside case 16a of battery cover 6a. The other end of middle lead plate 22 is attached to positive electrode 12 of battery 4b by soldering or spot welding, for example, inside case 16b of battery cover 6b. As exemplified in FIG. 2, a middle part between one end and the other end of middle lead plate 22 is drawn out from battery cover 6a and battery cover 6b, and is attached to safety unit 8 by soldering or spot welding, for example. The middle part of middle lead plate 22 may output a signal indicating an electric potential difference between adjacent batteries 4a and 4b, to safety unit 8.

Middle lead plate 24 is an electrode plate for electrically connecting negative electrode 14 of battery 4b and positive electrode 12 of battery 4c. As exemplified in FIG. 3, an end of middle lead plate 24 is attached to negative electrode 14 of battery 4b by soldering or spot welding, for example, inside case 16b of battery cover 6b. The other end of middle lead plate 24 is attached to positive electrode 12 of battery 4c by soldering or spot welding, for example, inside case 16c of battery cover 6c. As exemplified in FIG. 2, a middle part between one end and the other end of middle lead plate 24 is drawn out from battery cover 6b and battery cover 6c, and is attached to safety unit 8 by soldering or spot welding, for example. The middle part of middle lead plate 24 may output a signal indicating an electric potential difference between adjacent batteries 4b and 4c, to safety unit 8.

Batteries 4a to 4c are electrically connected in series by the aforementioned positive lead plate 18, negative lead plate 20, middle lead plate 22, and middle lead plate 24.

Safety unit 8 is a safety protection circuit board for controlling charging and discharging of each of batteries 4a to 4c. As exemplified in FIG. 2, safety unit 8 is attached to outer peripheral faces of battery covers 6a to 6c. An end of lead wire 26 is electrically connected to safety unit 8. Connector 28 is electrically connected to the other end of lead wire 26. Connector 28 is electrically connected to a circuit board (not shown) installed in the electronic device. Accordingly, signals and (or) electric power from safety unit 8 are supplied to the circuit board of the electronic device, through lead wire 26 and connector 28.

As exemplified in FIGS. 1 and 2, cover member 10 is a resin heat-shrinkable tubing for protecting safety unit 8, for example. Cover member 10 covers battery covers 6a to 6c and safety unit 8. Note that cover member 10 is omitted from FIGS. 3 and 4 for simplicity of the description.

[1-2. Configuration of Case]

Next, a configuration of case 16 is described with reference to FIGS. 1 to 6.

Figure 5:
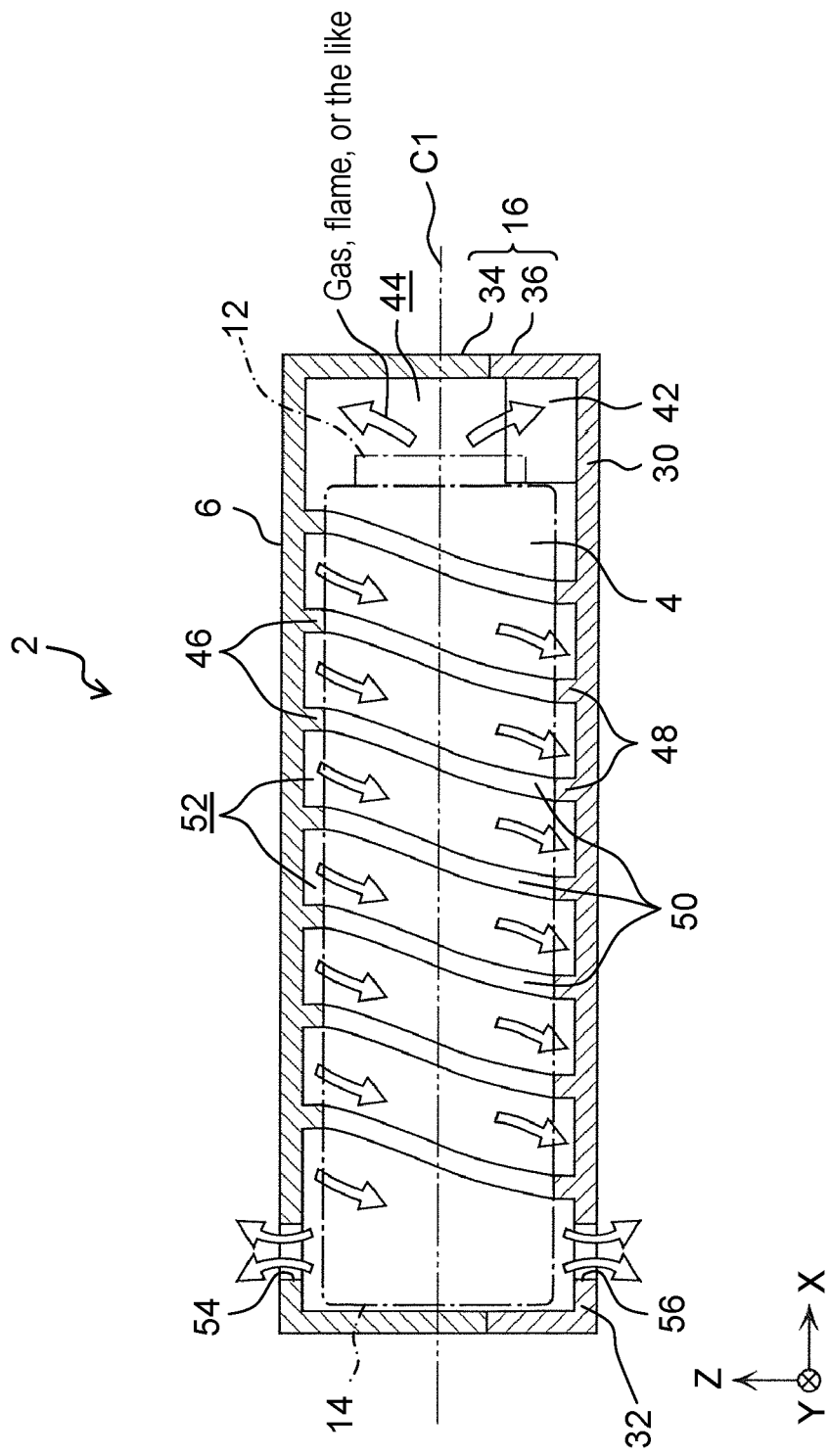
FIG. 5 is a partial cross-sectional view schematically showing the configuration example of the battery pack of the first exemplary embodiment.

FIG. 5 is a partial cross-sectional view schematically showing the configuration example of battery pack 2 of the first exemplary embodiment. FIG. 5 is a cross-sectional view of battery pack 2 illustrated in FIG. 1, which is taken along line IV-IV.

Figure 6:
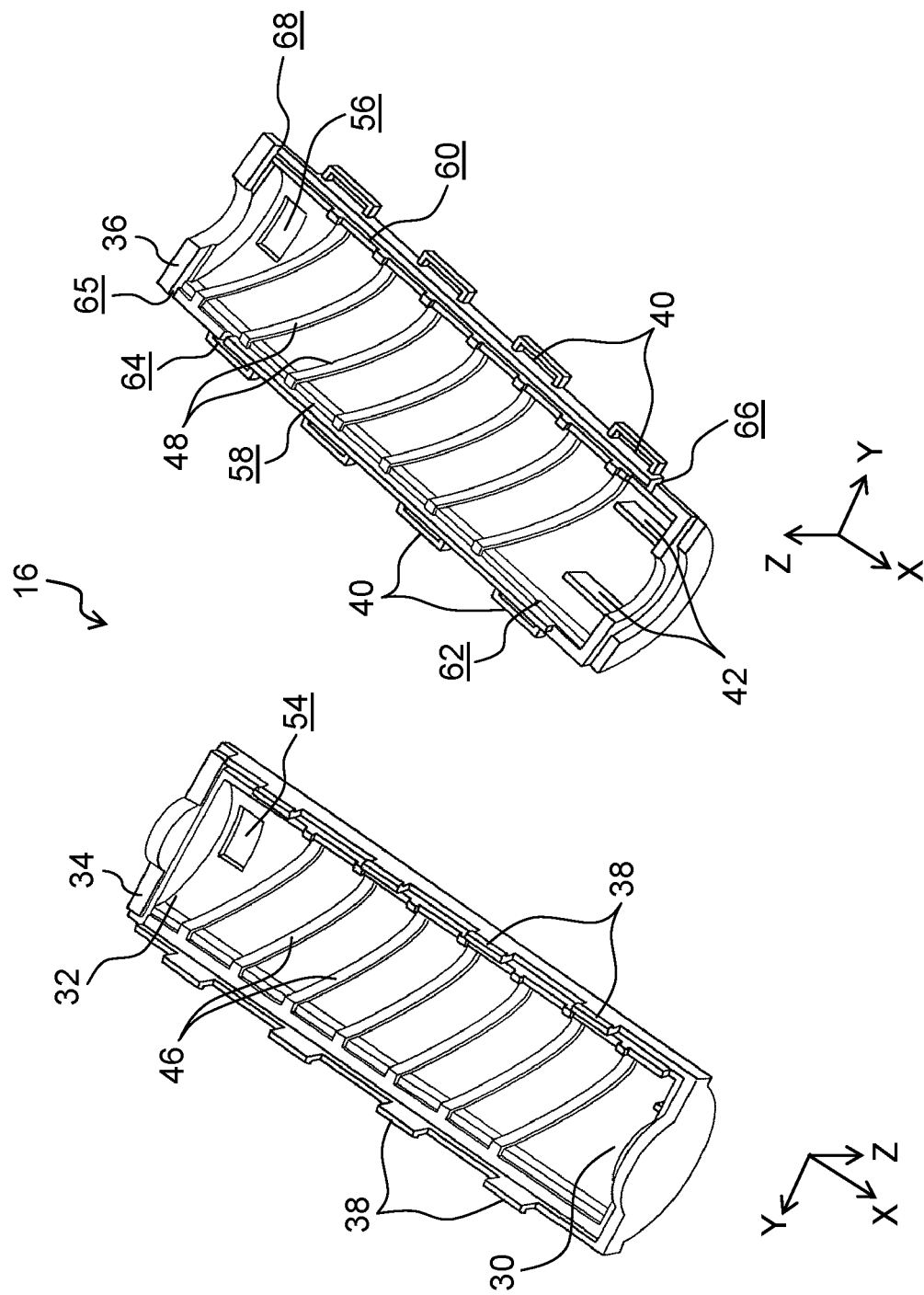
FIG. 6 is an exploded perspective view schematically showing a configuration example of a case included in the battery pack of the first exemplary embodiment.

FIG. 6 is an exploded perspective view schematically showing a configuration example of case 16 included in battery pack 2 of the first exemplary embodiment.

As exemplified in FIGS. 1 to 5, case 16 has first housing part 30 for housing positive electrode 12 of battery 4, and second housing part 32 for housing negative electrode 14 of battery 4. First housing part 30 is formed on one end (end on positive X direction side) of the long side (X-axis) of case 16, and second housing part 32 is formed on the other end (end on negative X direction side) of the long side of case 16.

As exemplified in FIG. 1, in battery pack 2, an end face (face on end on negative X direction side of case 16a) of second housing part 32 on the other end of case 16a of battery cover 6a and an end face (face on end on positive X direction side of case 16b) of first housing part 30 on one end of case 16b of battery cover 6b, are connected to each other by concavo-convex fitting, for example. Additionally, in battery pack 2, an end face (face on end on negative X direction side of case 16b) of second housing part 32 on the other end of case 16b of battery cover 6b and an end face (face on end on positive X direction side of case 16c) of first housing part 30 on one end of case 16c of battery cover 6c, are connected to each other by concavo-convex fitting, for example. Note that an end face of first housing part 30 and an end face of second housing part 32 of case 16 are faces formed substantially orthogonal (substantially parallel to YZ plane) to the long side (X-axis) of case 16, and close both ends of the long side (X-axis) of case 16.

As exemplified in FIGS. 1 to 6, case 16 has upper case 34 and lower case 36. Each of upper case 34 and lower case 36 is formed into a substantially semi-cylindrical shape. As exemplified in FIG. 6, a plurality of claws 38 are formed on the outer peripheral face on the edge of each of the two long sides (sides parallel to X-axis) of upper case 34. A plurality of holes 40 are formed on the outer peripheral face on the edge of each of the two long sides (sides parallel to X-axis) of lower case 36. Then, from the state where upper case 34 and lower case 36 are separate as exemplified in FIG. 3, the plurality of claws 38 of upper case 34 are inserted into the plurality of holes 40 of lower case 36 in which battery 4 is installed. Thus, upper case 34 and lower case 36 are connected as exemplified in FIG. 1, and battery 4 is housed inside case 16.

As exemplified in FIG. 6, a pair of space ensuring parts 42 for providing second space 44 (see FIGS. 4 and 5) is formed, on an inner face of lower case 36 in first housing part 30. The pair of space ensuring parts 42 is formed into a rib shape protruding along the long side (negative X direction) of case 16, from an inner face of an end face (end face on positive X direction side) on one end side of lower case 36. As exemplified in FIG. 5, tip ends of the pair of space ensuring parts 42 abut on positive electrode 12 (or surface around positive electrode 12 of battery 4) of battery 4 housed in case 16, to press battery 4 toward negative electrode 14 (negative X direction). This places battery 4 on the side (negative X direction) closer to second housing part 32 of the long side of case 16, inside case 16. For this reason, the distance between the end face (face on end on positive X direction side of case 16) of first housing part 30 on one end side of case 16 and positive electrode 12 of battery 4, is larger than the distance between the end face (face on end on negative X direction side of case 16) of second housing part 32 on the other end side of case 16 and negative electrode 14 of battery 4. Accordingly, as exemplified in FIGS. 4 and 5, second space 44 is formed between the end face (face on end on positive X direction side of case 16) of first housing part 30 on one end side of case 16 and positive electrode 12 of battery 4, inside case 16 in which battery 4 is housed. Since second space 44 is provided inside case 16, when gas, flame, or the like spurts from positive electrode 12 (or the periphery of positive electrode 12) due to excessive heating, the gas, flame, or the like is buffered by the air inside second space 44, is weakened to hit the end face (end face on positive X direction side) on one end side of case 16 and the periphery of the end face, and flows from second space 44 into first space 52. Hence, as compared to a case where second space 44 is not provided inside case 16, and gas, flame, or the like having spurted from positive electrode 12 (or the periphery of positive electrode 12) due to excessive heating hits the end face (end face on positive X direction side) on one end side of case 16 and the periphery of the end face without being weakened, case 16 having second space 44 can suppress damage caused by the gas, flame, or the like.

As exemplified in FIG. 6, a plurality of upper ribs 46 for providing first space 52 are formed on an inner peripheral face of upper case 34. The plurality of upper ribs 46 may be made of resin or the like, and be formed integrally with upper case 34, for example. The plurality of upper ribs 46 are disposed in parallel at substantially regular intervals along the long side (X-axis) of upper case 34, and extend while being tilted with respect to the long side (X-axis) of upper case 34.

As exemplified in FIG. 6, a plurality of lower ribs 48 for providing first space 52 are formed on an inner peripheral face of lower case 36. The plurality of lower ribs 48 may be made of resin or the like, and be formed integrally with lower case 36, for example. The plurality of lower ribs 48 are disposed in parallel at substantially regular intervals along the long side (X-axis) of lower case 36, and extend while being tilted with respect to the long side (X-axis) of lower case 36.

As exemplified in FIG. 5, the plurality of upper ribs 46 and the plurality of lower ribs 48 are provided such that, when upper case 34 and lower case 36 are coupled to each other, upper ribs 46 are connected to lower ribs 48 to form single helical and continuous discharge rib 50 on an inner peripheral face of case 16. That is, battery cover 6 illustrated in the present exemplary embodiment has a single helical and continuous discharge rib 50, on the inner peripheral face of case 16, which is formed by coupling upper case 34 and lower case 36 to each other. As has been described, in the present exemplary embodiment, single discharge rib 50 provided on the inner peripheral face of case 16 is formed of the plurality of upper ribs 46 and the plurality of lower ribs 48. Discharge rib 50 extends helically on the inner peripheral face of case 16, from first housing part 30 toward second housing part 32 around center axis C1 which is parallel to the X-axis of case 16. Note that the direction of the helical rotation may either be clockwise or anticlockwise.

Discharge rib 50 is formed large (tall) enough to come into contact with an outer peripheral face of battery 4 housed in case 16. Accordingly, in case 16, battery 4 is supported by discharge rib 50, and a gap depending on the height of discharge rib 50 is formed between the inner peripheral face of case 16 and the outer peripheral face of battery 4. Thus, first space 52 is formed by discharge rib 50, between the inner peripheral face of case 16 and the outer peripheral face of battery 4. In the present exemplary embodiment, first space 52 is a space for generating a helical air stream that flows from first housing part 30 toward second housing part 32, inside case 16 housing battery 4.

As exemplified in FIGS. 3 to 6, air hole 54 communicating the inside and outside of case 16 is formed on a side face of upper case 34 on second housing part 32 side (position relatively closer to face on end on negative X direction side of upper case 34). Additionally, as exemplified in FIGS. 2 and 4 to 6, air hole 56 communicating the inside and outside of case 16 is formed on a side face of lower case 36 on second housing part 32 side (position relatively closer to face on end on negative X direction side of lower case 36). Accordingly, air hole 54 and air hole 56 are disposed in positions (positions on case 16 closer to face on end on negative X direction side than to face on end on positive X direction side) on case 16 closer to second housing part 32 than to first housing part 30. That is, the distance between the end face (face on end on negative X direction side of case 16) of second housing part 32 on the other end side of case 16 and air holes 54 and 56, is shorter than the distance between the end face (face on end on positive X direction side of case 16) of first housing part 30 on one end side of case 16 and air holes 54 and 56. Thus, air hole 54 and air hole 56 are disposed in the vicinity of negative electrode 14 of battery 4 housed in case 16.

As exemplified in FIG. 6, in lower case 36, groove 58 is formed between the outer peripheral face and the inner peripheral face of the edge of one of the two long sides (sides parallel to X-axis), and groove 60 is formed between the outer peripheral face and the inner peripheral face of the edge of the other of the two long sides (sides parallel to X-axis). Each of groove 58 and groove 60 is a groove for housing positive lead plate 18 or negative lead plate 20. Each of groove 58 and groove 60 extends linearly along the long side (X-axis) of lower case 36.

As exemplified in FIG. 6, in lower case 36, at the edge of one of the two long sides (sides parallel to X-axis), opening 62 is formed on first housing part 30 side (position relatively closer to face on end on positive X direction side of lower case 36), and opening 64 is formed on second housing part 32 side (position relatively closer to face on end on negative X direction side of lower case 36). Each of opening 62 and opening 64 is communicated with groove 58. Additionally, in lower case 36, at the edge of one of the two long sides (sides parallel to X-axis), opening 65 that is not communicated with groove 58 is formed on second housing part 32 side (position closer to face on end on negative X direction side of lower case 36 than opening 64).

As exemplified in FIG. 6, in lower case 36, at the edge of the other of the two long sides (sides parallel to X-axis), opening 66 is formed on first housing part 30 side (position relatively closer to face on end on positive X direction side of lower case 36), and opening 68 is formed on second housing part 32 side (position relatively closer to face on end on negative X direction side of lower case 36). Each of opening 66 and opening 68 is communicated with groove 60.

As exemplified in FIGS. 2 and 3, in battery cover 6a, positive lead plate 18 is housed in groove 58 of case 16a. One end of positive lead plate 18 is inserted into case 16a through opening 62 of case 16a, and is connected to positive electrode 12 of battery 4a inside case 16a. The other end of positive lead plate 18 is drawn out of case 16a through opening 64 of case 16a. Since positive lead plate 18 is housed in groove 58 of case 16a in this manner, in battery pack 2, positive lead plate 18 does not come into contact with the outer peripheral face of battery 4a housed in case 16a. Accordingly, in battery pack 2, positive lead plate 18 and battery 4a housed in case 16a can be electrically insulated, except for positive electrode 12.

As exemplified in FIGS. 2 and 3, in battery cover 6a, one end of middle lead plate 22 is inserted into case 16a through opening 68 of case 16a, and is connected to negative electrode 14 of battery 4a inside case 16a. In battery cover 6b, the other end of middle lead plate 22 is inserted into case 16b through opening 66 of case 16b, and is connected to positive electrode 12 of battery 4b inside case 16b.

As exemplified in FIGS. 2 and 3, in battery cover 6b, one end of middle lead plate 24 is inserted into case 16b through opening 65 of case 16b, and is connected to negative electrode 14 of battery 4b inside case 16b. In battery cover 6c, the other end of middle lead plate 24 is inserted into case 16c through opening 62 of case 16c, and is connected to positive electrode 12 of battery 4c inside case 16c.

As exemplified in FIGS. 2 and 3, in battery cover 6c, negative lead plate 20 is housed in groove 60 of case 16c. One end of negative lead plate 20 is inserted into case 16c through opening 68 of case 16c, and is connected to negative electrode 14 of battery 4c inside case 16c. The other end of negative lead plate 20 is drawn out of case 16c through opening 66 of case 16c. Since negative lead plate 20 is housed in groove 60 of case 16c in this manner, in battery pack 2, negative lead plate 20 does not come into contact with the outer peripheral face of battery 4c housed in case 16c. Accordingly, in battery pack 2, negative lead plate 20 and battery 4c housed in case 16c can be electrically insulated, except for negative electrode 14.

[1-3. Effects and Others]

As has been described, in the present exemplary embodiment, a battery cover includes: a case for housing a battery; and a rib formed on an inner peripheral face of the case to form a first space between the inner peripheral face of the case and an outer peripheral face of the battery. The case has an air hole that communicates the inside and outside of the case, a first housing part for housing a positive electrode of the battery, and a second housing part for housing a negative electrode of the battery. The air hole is disposed in a position in the case closer to the second housing part than to the first housing part.

Note that each of battery covers 6 (6a to 6c) is an example of the battery cover. Each of batteries 4 (4a to 4c) is an example of the battery. Each of cases 16 (16a to 16c) is an example of the case. First space 52 is an example of the first space. Discharge rib 50 is an example of the rib. Each of air hole 54 and air hole 56 is an example of the air hole. Positive electrode 12 is an example of the positive electrode. First housing part 30 is an example of the first housing part. Negative electrode 14 is an example of the negative electrode. Second housing part 32 is an example of the second housing part.

For example, in the example illustrated in the first exemplary embodiment, battery cover 6 includes: case 16 for housing battery 4; and discharge rib 50 formed on an inner peripheral face of case 16 to form first space 52 between the inner peripheral face of case 16 and an outer peripheral face of battery 4. Case 16 has air hole 54 and air hole 56 that communicate the inside and outside of case 16, first housing part 30 for housing positive electrode 12 of battery 4, and second housing part 32 for housing negative electrode 14 of battery 4. Air hole 54 and air hole 56 are disposed in positions on case 16 closer to second housing part 32 than to first housing part 30.

Battery cover 6 configured in this manner can downsize case 16, and can also reduce influence to peripheral parts when gas, flame, or the like spurts from the inside of battery 4.

When a secondary battery generates heat and the temperature of the secondary battery becomes excessively high due to excessive charging and discharging or an internal short-circuit, for example, gas, flame, or the like may spurt (accidental explosion) to the outside from the inside of the secondary battery. In such a case, gas, flame, or the like tends to spurt from the positive electrode (or the periphery of the positive electrode) of the secondary battery. For example, when battery 4 which is a secondary battery accidentally explodes due to excessive heating, gas, flame, or the like (including contents such as electrolyte of battery 4) may spurt from positive electrode 12 (or the periphery of positive electrode 12) of battery 4.

In battery cover 6 illustrated in the present exemplary embodiment, discharge rib 50 provided on an inner peripheral face of case 16 forms first space 52 that extends from first housing part 30 toward second housing part 32, between the inner peripheral face of case 16 and the outer peripheral face of battery 4. Additionally, in case 16, air hole 54 and air hole 56 are formed in the vicinity of negative electrode 14 of battery 4. Accordingly, when battery 4 accidentally explodes due to excessive heating and gas, flame, or the like spurts from positive electrode 12 (or the periphery of positive electrode 12) of battery 4, the gas, flame, or the like having spurted from positive electrode 12 (or the periphery of positive electrode 12) of battery 4 flows through first space 52 formed by discharge rib 50 to move to air hole 54 and air hole 56, and is then discharged to the outside of case 16 from air hole 54 and air hole 56, as indicated by an outlined arrow in FIG. 5.

At this time, the gas, flame, or the like is cooled while flowing through first space 52 from first housing part 30 to second housing part 32. Thus, battery cover 6 can reduce (e.g., reduce to lower than 100° C.) the temperature of gas, flame, or the like having spurted from positive electrode 12 (or the periphery of positive electrode 12) of battery 4. That is, in battery cover 6, when gas, flame, or the like spurts from positive electrode 12 (or the periphery of positive electrode 12) of battery 4, the gas, flame, or the like can be discharged to the outside of battery cover 6 from air hole 54 and air hole 56, with the temperature of the gas, flame, or the like reduced sufficiently. Accordingly, battery cover 6 can suppress spreading of the high-temperature gas, flame, or the like having spurted from the inside of battery 4 to peripheral parts of battery cover 6. Hence, when gas, flame, or the like spurts from positive electrode 12 (or the periphery of positive electrode 12) of battery 4, for example, battery cover 6 can suppress fire spreading to a circuit board or the like provided around battery cover 6.

According to battery cover 6 illustrated in the present exemplary embodiment, when gas, flame, or the like spurts from positive electrode 12 of battery 4, the temperature of the gas, flame, or the like can be reduced without using the aforementioned filter part disclosed in PTL 1. Hence, as compared to the conventional technique disclosed in PTL 1, battery cover 6 illustrated in the present exemplary embodiment can downsize battery cover 6 since battery cover 6 does not use the filter part described in the conventional technique.

Note that if case 16 is made of a self-extinguishing material such as polycarbonate, when gas, flame, or the like spurts from positive electrode 12 (or the periphery of positive electrode 12) of battery 4, fire spreading to a circuit board or the like provided around battery cover 6 can be suppressed even more effectively.

In the battery cover, a rib may extend helically from the first housing part toward the second housing part.

For example, in the example illustrated in the first exemplary embodiment, discharge rib 50 extends helically from first housing part 30 toward second housing part 32.

In battery cover 6 configured in this manner, single helical and continuous discharge rib 50 provided on the inner peripheral face of case 16 forms helical first space 52 extending from first housing part 30 toward second housing part 32, between the inner peripheral face of case 16 and the outer peripheral face of battery 4. Hence, in battery cover 6, when battery 4 accidentally explodes due to excessive heating, the gas, flame, or the like having spurted from positive electrode 12 (or the periphery of positive electrode 12) of battery 4 flows helically through first space 52 along discharge rib 50 to move to air hole 54 and air hole 56, and is then discharged to the outside of case 16 from air hole 54 and air hole 56, as indicated by the outlined arrow in FIG. 5. Accordingly, in battery cover 6, the route through which the gas, flame, or the like flows in first space 52 can be extended, whereby the temperature of the gas, flame, or the like having spurted from positive electrode 12 (or the periphery of positive electrode 12) of battery 4 can be reduced effectively. Note that the inner diameter of case 16, the height of discharge rib 50, the crude density of the helix of discharge rib 50, and the like that form first space 52 are preferably set on the basis of the outer diameter of battery 4, so that gas, flame, or the like having spurted from positive electrode 12 (or the periphery of positive electrode 12) can flow through first space 52 appropriately.

The battery cover may further include a space ensuring part formed on an inner face of first housing part to form a second space between an end face of first housing part and the positive electrode of the battery.

Note that space ensuring part 42 is an example of the space ensuring part.

For example, in the example illustrated in the first exemplary embodiment, battery cover 6 further includes space ensuring part 42 formed on an inner face (inner face on end face on first housing part 30 side of case 16) of first housing part 30, to form second space 44 between an end face of first housing part 30 and positive electrode 12 of battery 4.

Battery cover 6 configured in this manner can separate positive electrode 12 of battery 4 from the end face (end face on first housing part 30 side of case 16) of first housing part 30. Hence, when battery 4 accidentally explodes due to excessive heating, battery cover 6 can suppress damage caused by gas, flame, or the like spurting from positive electrode 12 (or the periphery of positive electrode 12) of battery 4 on the end face of first housing part 30.

The battery cover may include: an electrode plate that has one end electrically connected to one of the positive electrode and the negative electrode of the battery; and a groove that is formed inside the case, houses the electrode plate, and draws out the other end of the electrode plate from the inside of the case to the outside of the case.

Note that each of positive lead plate 18 and negative lead plate 20 is an example of the electrode plate. Each of groove 58 and groove 60 is an example of the groove.

For example, in the example illustrated in the first exemplary embodiment, battery cover 6 (6a) includes: positive lead plate 18 that has one end electrically connected to positive electrode 12 of battery 4 (4a); and groove 58 that is formed inside case 16 (16a), houses positive lead plate 18, and draws the other end of positive lead plate 18 out of case 16 (16a). In addition, battery cover 6 (6c) includes: negative lead plate 20 that has one end electrically connected to negative electrode 14 of battery 4 (4c); and groove 60 that is formed inside case 16 (16c), houses negative lead plate 20 and draws out the other end of negative lead plate 20 from the inside of case 16 (16c) to the outside of case 16 (16c).

In battery cover 6 (6a, 6c) configured in this manner, since positive lead plate 18 is housed in groove 58 of case 16 (16a), positive lead plate 18 does not come into contact with an outer peripheral face of battery 4 (4a). Additionally, since negative lead plate 20 is housed in groove 60 of case 16 (16c), negative lead plate 20 does not come into contact with an outer peripheral face of battery 4 (4c). Thus, in battery cover 6 (6a, 6c), positive lead plate 18 and the outer peripheral face of battery 4 (4a) can be electrically insulated and negative lead plate 20 and the outer peripheral face of battery 4 (4c) can be electrically insulated, without using an insulating member such as an insulating tape.

In the present exemplary embodiment, a battery pack includes: a plurality of battery covers; and a plurality of batteries electrically connected to one another, and respectively housed in the plurality of battery covers.

Note that battery pack 2 is an example of the battery pack. Battery covers 6a to 6c are an example of the plurality of battery covers. Batteries 4a to 4c are an example of the plurality of batteries.

For example, in the example illustrated in the first exemplary embodiment, battery pack 2 includes: a plurality of battery covers 6a to 6c; and a plurality of batteries 4a to 4c electrically connected to one another, and respectively housed in the plurality of battery covers 6a to 6c.

Battery pack 2 configured in this manner uses the aforementioned battery cover 6. Hence, as mentioned earlier, battery pack 2 can be downsized, and also influence to peripheral parts can be reduced when gas, flame, or the like spurts from the inside of one or several of the plurality of batteries 4 housed in battery pack 2.

Second Exemplary Embodiment

Battery pack 2A and battery cover 6A illustrated in a second exemplary embodiment have substantially the same configuration as battery pack 2 and battery cover 6 illustrated in the first exemplary embodiment. Note, however, that battery cover 6A illustrated in the second exemplary embodiment differs from battery cover 6 illustrated in the first exemplary embodiment in that plate member 70 is provided. Hereinafter, points that differ between battery cover 6 illustrated in the first exemplary embodiment and battery cover 6A illustrated in the second exemplary embodiment are mainly described.

Note that the same reference numerals as in the first exemplary embodiment denote substantially the same constituent elements in the following description, and a description of the constituent elements will be omitted or simplified.

[2-1. Configuration of Battery Pack]

Hereinafter, a configuration of battery pack 2A according to the second exemplary embodiment is described with reference to FIG. 7.

Figure 7:
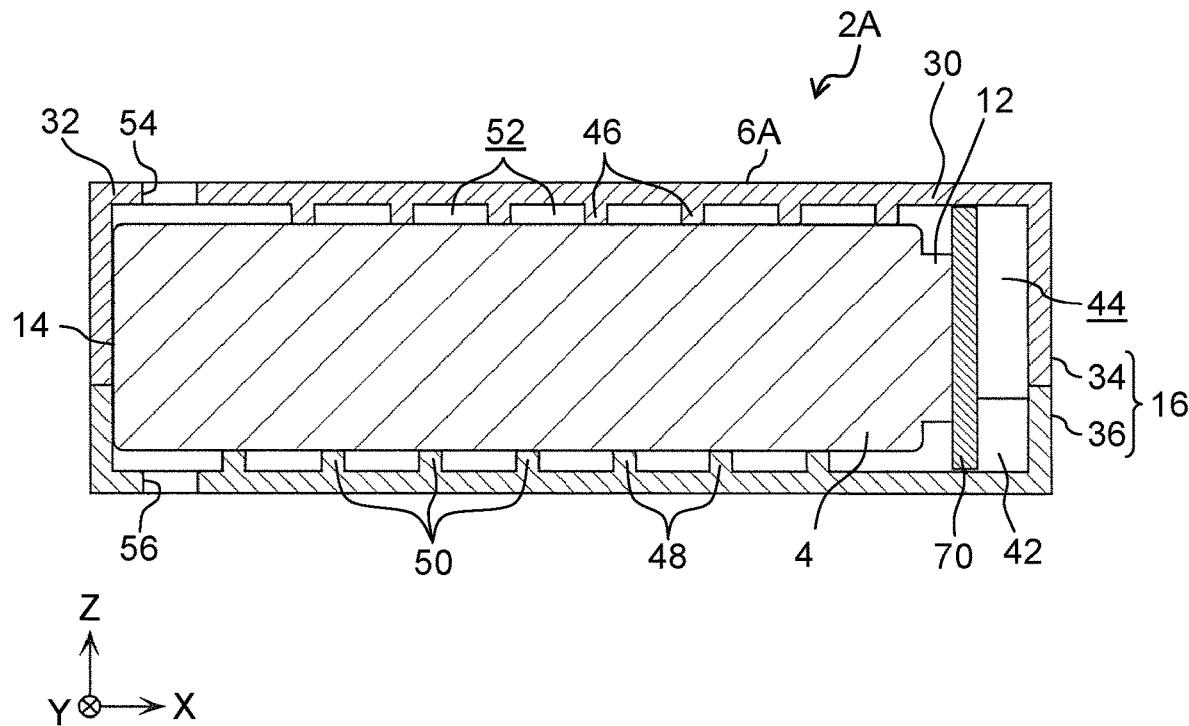
FIG. 7 is a partial cross-sectional view schematically showing a configuration example of a battery pack of a second exemplary embodiment.

FIG. 7 is a partial cross-sectional view schematically showing a configuration example of battery pack 2A of the second exemplary embodiment. Note that although FIG. 7 shows a cross-sectional view of one of a plurality of (e.g., three) battery covers 6A included in battery pack 2A, battery pack 2A may have one, two, four, or more battery covers 6A.

As exemplified in FIG. 7, each of the plurality of (e.g., three) battery covers 6A included in battery pack 2A of the second exemplary embodiment further has plate member 70, in addition to the configuration of battery cover 6 illustrated in the first exemplary embodiment. Plate member 70 is made of a stainless metal plate, for example, and is formed into a disc shape whose size depends on the inner diameter of case 16 of battery cover 6A.

In battery cover 6A, plate member 70 is housed in first housing part 30 of case 16 of battery cover 6A, and is attached to positive electrode 12 of battery 4 with an adhesive member such as a pressure sensitive adhesive double coated tape or an adhesive agent. The plate member 70 covers positive electrode 12 of battery 4.

Note that slits (not shown) into which plate member 70 can be inserted may be provided in a pair of space ensuring parts 42, and plate member 70 may be inserted into the slits to be attached inside case 16 of battery cover 6A, instead of using the adhesive member such as a pressure sensitive adhesive double coated tape or an adhesive agent.

[2-2. Effects and Others]

As has been described, in addition to the configuration of the battery cover illustrated in the first exemplary embodiment, a battery cover may further include a plate member that is housed in a first housing part and covers a positive electrode of a battery.

Note that plate member 70 is an example of the plate member.

For example, in the example illustrated in the second exemplary embodiment, in addition to the configuration of battery cover 6 illustrated in the first exemplary embodiment, battery cover 6A further includes plate member 70 that is housed in first housing part 30 and covers positive electrode 12 of battery 4.

When battery 4 accidentally explodes due to excessive heating, battery cover 6A configured in this manner can shield or weaken gas, flame, or the like spurting from positive electrode 12 (or the periphery of positive electrode 12) of battery 4, by plate member 70. Hence, battery cover 6A can more effectively suppress damage caused by gas, flame, or the like spurting from positive electrode 12 (or the periphery of positive electrode 12) of battery 4 on an end face of first housing part 30.

Third Exemplary Embodiment

The first exemplary embodiment describes a configuration example in which battery covers 6a to 6c are disposed in series along the long side (X-axis) of battery pack 2. However, the present disclosure is by no means limited to this configuration example. In a battery pack, a plurality of battery covers may be disposed in parallel. A third exemplary embodiment describes a configuration example in which a plurality of (e.g., three) battery covers 6Ba to 6Bc are disposed in parallel in battery pack 2B.

Note that the configuration of battery pack 2B illustrated in the third exemplary embodiment and the configuration of battery pack 2 illustrated in the first exemplary embodiment are substantially the same, except for the placement of the plurality of battery covers. The same reference numerals as in the first exemplary embodiment denote substantially the same constituent elements in the following description, and a description of the constituent elements will be omitted or simplified.

[3-1. Configuration of Battery Pack]

Hereinafter, a configuration of battery pack 2B according to the third exemplary embodiment is described with reference to FIGS. 8 and 9.

Figure 8:
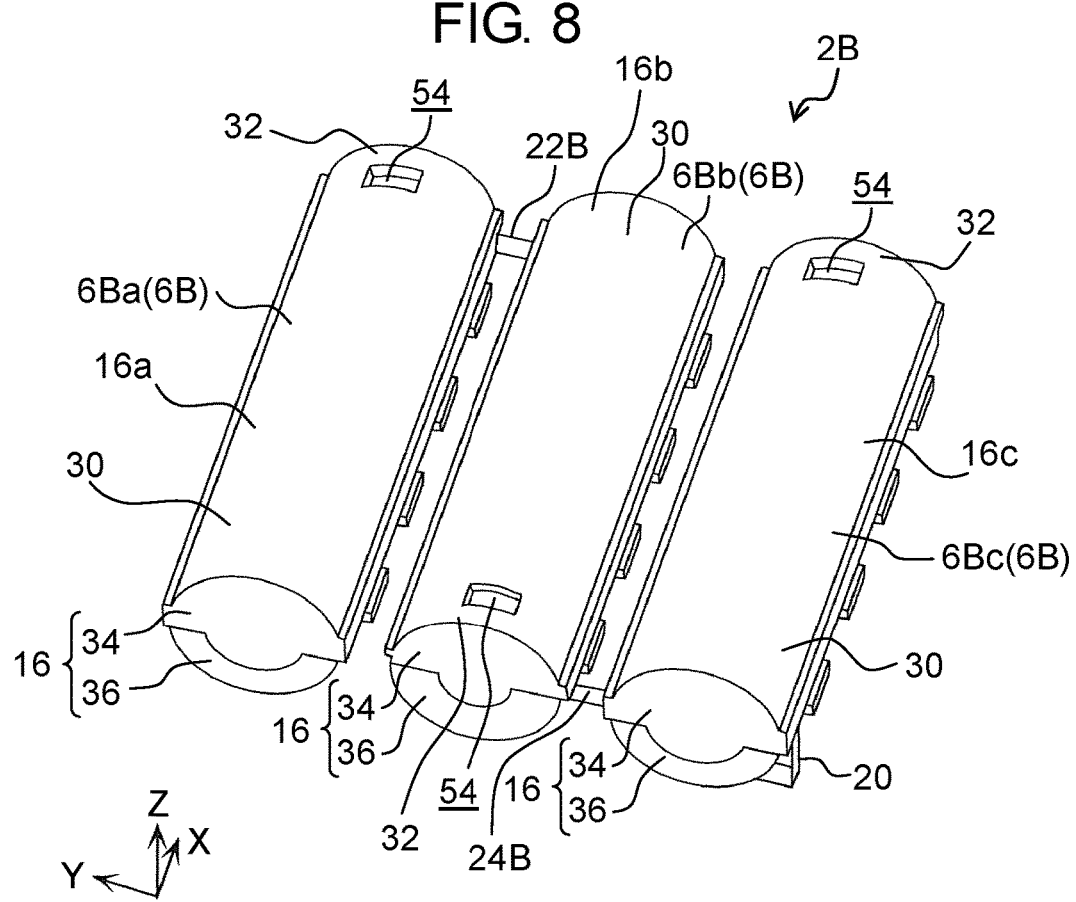
FIG. 8 is a perspective view schematically showing a configuration example of a battery pack of a third exemplary embodiment.

FIG. 8 is a perspective view schematically showing a configuration example of battery pack 2B of the third exemplary embodiment.

Figure 9:
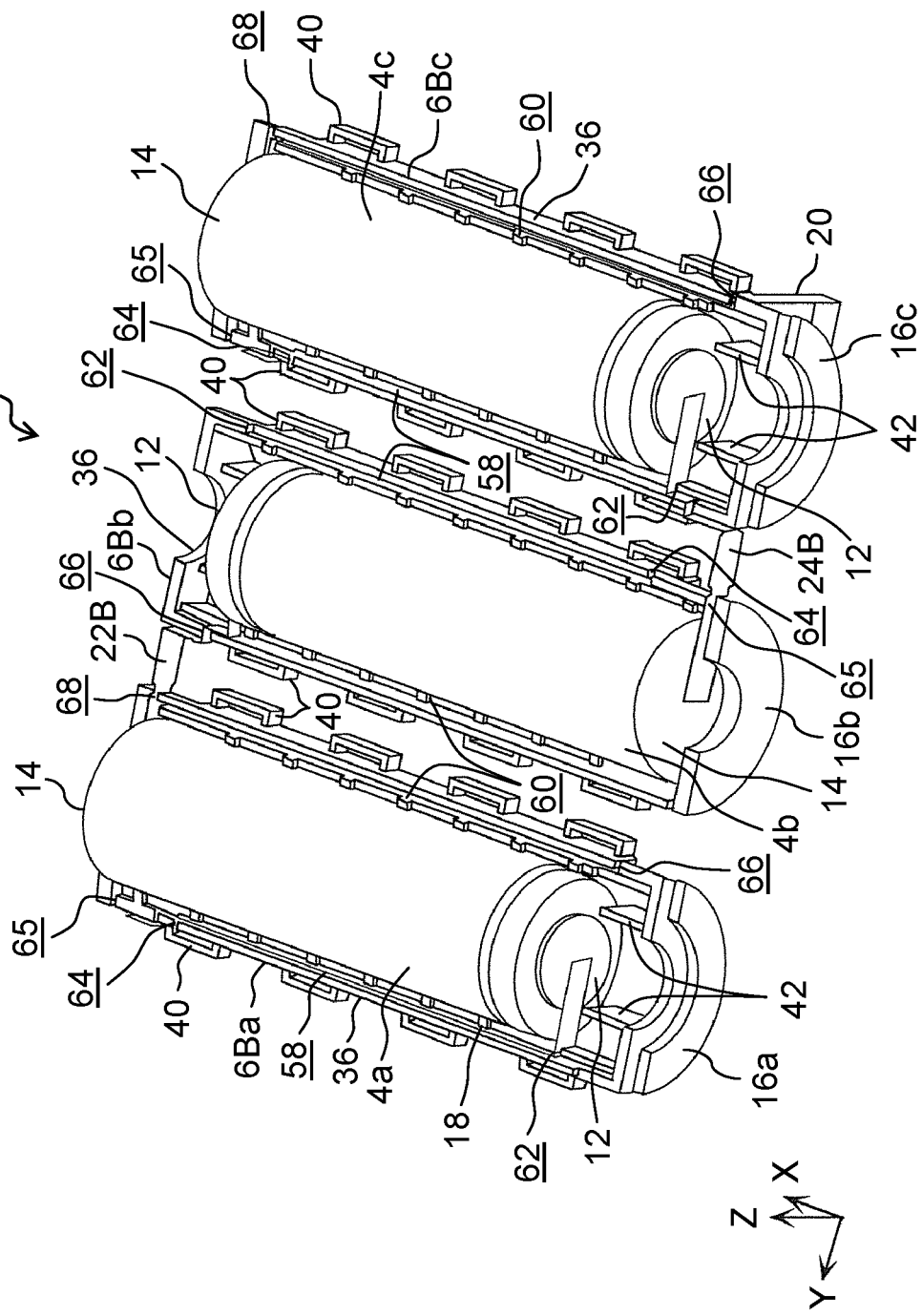
FIG. 9 is a perspective view schematically showing a configuration example of an internal structure of the battery pack of the third exemplary embodiment.

FIG. 9 is a perspective view schematically showing a configuration example of an internal structure of battery pack 2B of the third exemplary embodiment.

Note that as in the case of battery pack 2 illustrated in the first exemplary embodiment, battery pack 2B of the third exemplary embodiment includes safety unit 8, cover member 10, lead wire 26, connector 28, and the like. However, these parts are omitted in FIGS. 8 and 9 for simplicity of the description.

As shown in FIGS. 8 and 9, battery pack 2B of the third exemplary embodiment includes a plurality of (e.g., three) batteries 4a, 4b, 4c, and a plurality of (e.g., three) battery covers 6Ba, 6Bb, 6Bc. Additionally, battery cover 6Ba has case 16a, battery cover 6Bb has case 16b, and battery cover 6Bc has case 16c. Battery cover 6Ba is a cover for housing battery 4a, battery cover 6Bb is a cover for housing battery 4b, and battery cover 6Bc is a cover for housing battery 4c. Note that since battery covers 6Ba to 6Bc have substantially the same structure, in the following description, battery covers 6Ba to 6Bc are also collectively referred to as "battery cover 6B" when the parts do not need to be described separately. Since battery cover 6B illustrated in the present exemplary embodiment has substantially the same configuration as battery cover 6 illustrated in the first exemplary embodiment, detailed description of battery cover 6B is omitted.

Battery covers 6Ba to 6Bc are disposed in parallel along a direction (Y-axis) orthogonal to the long side of battery covers 6Ba to 6Bc. Additionally, battery covers 6Ba to 6Bc are connected to one another and disposed such that batteries 4a to 4c are electrically connected in series. Specifically, battery cover 6Bb is oriented in a direction (e.g., oriented such that first housing part 30 is disposed on positive X direction side and second housing part 32 is disposed on negative X direction side) opposite to the direction (e.g., oriented such that first housing part 30 is disposed on negative X direction side and second housing part 32 is disposed on positive X direction side) in which battery cover 6Ba and battery cover 6Bc are oriented. Accordingly, second housing part 32 of case 16a of battery cover 6Ba is adjacent to first housing part 30 of case 16b of battery cover 6Bb, and second housing part 32 of case 16b of battery cover 6Bb is adjacent to first housing part 30 of case 16c of battery cover 6Bc.

As exemplified in FIG. 9, in battery cover 6Ba, positive lead plate 18 is housed in groove 58 of case 16a. One end of positive lead plate 18 is inserted into case 16a through opening 62 of case 16a, and is connected to positive electrode 12 of battery 4a inside case 16a. The other end of positive lead plate 18 is drawn out of case 16a through opening 64 of case 16a.

As exemplified in FIG. 9, in battery cover 6Ba, one end of middle lead plate 22B is inserted into case 16a through opening 68 of case 16a, and is connected to negative electrode 14 of battery 4a inside case 16a. In battery cover 6Bb, the other end of middle lead plate 22B is inserted into case 16b through opening 66 of case 16b, and is connected to positive electrode 12 of battery 4b inside case 16b.

As exemplified in FIG. 9, in battery cover 6Bb, one end of middle lead plate 24B is inserted into case 16b through opening 65 of case 16b, and is connected to negative electrode 14 of battery 4b inside case 16b. In battery cover 6Bc, the other end of middle lead plate 24B is inserted into case 16c through opening 62 of case 16c, and is connected to positive electrode 12 of battery 4c inside case 16c.

As exemplified in FIG. 9, in battery cover 6Bc, negative lead plate 20 is housed in groove 60 of case 16c. One end of negative lead plate 20 is inserted into case 16c through opening 68 of case 16c, and is connected to negative electrode 14 of battery 4c inside case 16c. The other end of negative lead plate 20 is drawn out of case 16c through opening 66 of case 16c.

Batteries 4a to 4c are electrically connected in series by the aforementioned positive lead plate 18, negative lead plate 20, middle lead plate 22B, and middle lead plate 24B.

[3-2. Effects and Others]

As has been described, a battery pack is not limited to the configuration illustrated in the first exemplary embodiment where a plurality of battery covers are disposed in series along the long side (X-axis) of the battery pack, and may be configured as in the present exemplary embodiment where a plurality of battery covers are disposed in parallel.

Battery pack 2B configured in this manner, too, uses battery cover 6B which has substantially the same configuration as battery cover 6 illustrated in the first exemplary embodiment. Hence, as mentioned earlier, battery pack 2B can be downsized, and also influence to peripheral parts can be reduced when gas, flame, or the like spurts from the inside of one or several of the plurality of batteries 4 housed in battery pack 2B. That is, effects similar to the first exemplary embodiment can also be achieved by the present exemplary embodiment.

Other Exemplary Embodiments

Hereinabove, the first to third exemplary embodiments have been described to exemplify a technique disclosed in the present application. However, the technique in the present disclosure is not limited to this, and can also be applied to an exemplary embodiment in which modification, replacement, addition, omission, or the like is performed. In addition, a new exemplary embodiment can be made by combining constituents described in the above first to third exemplary embodiments.

Other exemplary embodiments are therefore described hereinafter.

Although battery 4 is a non-aqueous electrolyte secondary battery such as a lithium ion battery in the description of the first exemplary embodiment, battery 4 is by no means limited to a non-aqueous electrolyte secondary battery. Battery 4 may be a battery other than a non-aqueous electrolyte secondary battery.

Although the first exemplary embodiment describes a configuration example in which case 16 is formed by coupling upper case 34 and lower case 36 to each other, the present disclosure is by no means limited to this configuration example. For example, case 16 may be formed by coupling three or more cases to one another. Alternatively, case 16 may be integrally formed into a substantial cylinder.

Although the first exemplary embodiment describes a configuration example in which battery pack 2 includes three battery covers 6 (6a to 6c), the present disclosure is by no means limited to this configuration example. Battery pack 2 may have one, two, four, or more battery covers 6.

Although the first exemplary embodiment describes a configuration example in which each of air hole 54 and air hole 56 is formed into a substantial rectangle in plan view as exemplified in the drawings, the present disclosure is by no means limited to this configuration example. Air hole 54 and air hole 56 may be formed into a circle, an oval, a polygon, or the like.

Although the first exemplary embodiment describes a configuration example in which air hole 54 is provided in upper case 34 and air hole 56 is provided in lower case 36, the present disclosure is by no means limited to this configuration example. Case 16 may have one, three, or more air holes.

Although the first exemplary embodiment describes a configuration example in which air hole 54 is provided in a side face of upper case 34 and air hole 56 is provided in a side face of lower case 36, the present disclosure is by no means limited to this configuration example. Air hole 54 may be provided in an end face of upper case 34. Air hole 56 may be provided in an end face of lower case 36.

Although the first exemplary embodiment describes a configuration example in which single helically extending discharge rib 50 is formed on the inner peripheral face of case 16, the present disclosure is by no means limited to this configuration example. For example, a plurality of meandering (wave-shaped) discharge ribs 50 extending from first housing part 30 toward second housing part 32 may be spaced apart in the peripheral direction on an inner peripheral face of case 16.

Although the first exemplary embodiment describes a configuration example in which groove 58 and groove 60 are provided in case 16, the present disclosure is by no means limited to this configuration example. For example, both or one of groove 58 and groove 60 may be omitted from case 16. In case 16 configured in this manner, positive lead plate 18 and (or) negative lead plate 20 may be covered with insulating tape, for example, to electrically insulate positive lead plate 18 and (or) negative lead plate 20 from battery 4.

Although the first exemplary embodiment describes a configuration example in which space ensuring part 42 protrudes in a rib shape as in FIG. 6, for example, the present disclosure is by no means limited to this configuration example. Space ensuring part 42 may be formed in any shape, as long as space ensuring part 42 is configured to press battery 4 housed in case 16 toward negative electrode 14 (negative X direction).

Although the first exemplary embodiment describes a configuration example in which space ensuring part 42 is provided on an inner face of an end face (end face on positive X direction of case 16) of first housing part 30 of case 16, as in FIG. 6, for example, the present disclosure is by no means limited to this configuration example. Space ensuring part 42 may be disposed in any location, as long as space ensuring part 42 can press battery 4 housed in case 16 toward negative electrode 14 (negative X direction). Space ensuring part 42 may be provided on an inner peripheral face of case 16.

The diameter of plate member 70 illustrated in the second exemplary embodiment may be substantially the same as the inner diameter of case 16 of battery cover 6A, or may be smaller than the inner diameter of case 16. Although plate member 70 formed in a disc shape is exemplified in the second exemplary embodiment, the shape of plate member 70 is by no means limited to a disc shape, and may be rectangular, ellipsoidal, or polygonal. The size and shape of plate member 70 is by no means limited, as long as the aimed effect (i.e., shielding or weakening gas, flame, or the like spurting from positive electrode 12 (or the periphery of positive electrode 12) of battery 4 having accidentally exploded due to excessive heating) can be achieved.

The exemplary embodiments have been described as examples of the technique in the present disclosure. The accompanying drawings and the detailed description have been provided for this purpose.

Accordingly, the constituent elements illustrated and described in the accompanying drawings and the detailed description may include not only the constituent elements that are essential for solving the problems, but also the constituent elements that are not essential for solving the problems. For this reason, those inessential constituent elements that are illustrated in the appended drawings or are described in the detailed description should not immediately be acknowledged as essential.

The above exemplary embodiments are provided for exemplification of the technique according to the present disclosure, and can thus be modified, replaced, added, removed, and the like in various manners within the scope of the claims or an equivalent scope.

INDUSTRIAL APPLICABILITY

The present disclosure is applicable to a battery cover for housing a battery. The present disclosure is also applicable to a battery pack in which a plurality of battery covers housing batteries are disposed and electrically connected to one another.

REFERENCE MARKS IN THE DRAWINGS 2, 2A, 2B: battery pack
4, 4a, 4b, 4c: battery
6, 6a, 6b, 6c, 6A, 6Aa, 6Ab, 6Ac, 6B, 6Ba, 6Bb, 6Bc: battery cover
8: safety unit
10: cover member
12: positive electrode
14: negative electrode
16, 16a, 16b, 16c: case
18: positive lead plate
20: negative lead plate
22, 22B, 24, 24B: middle lead plate
26: lead wire
28: connector
30: first housing part
32: second housing part
34: upper case
36: lower case
38: claw
40: hole
42: space ensuring part
44: second space
46: upper rib
48: lower rib
50: discharge rib
52: first space
54, 56: air hole
58, 60: groove
62, 64, 65, 66, 68: opening
70: plate member

The invention claimed is:

1. A battery cover comprising:
a case configured to house a battery, the case having an air hole located on an outer circumferential surface of the case and the air hole communicating with an inside and an outside of the case, and a first housing portion at or adjacent a first end of the case and a second housing portion at or adjacent a second end of the case opposite the first end, wherein
the first housing portion includes a positive terminal of the battery when the battery is housed in the case, and
the second housing portion includes a negative terminal of the battery when the battery is housed in the case; and
a single helical rib on an inner peripheral face of the case to form a first space between the inner peripheral face of the case and an outer peripheral face of the battery, wherein
the single helical rib is arranged continuously along an outer peripheral face of the battery when the battery is housed in the case and is in direct continuous contact with the outer peripheral face of the battery,
the air hole is disposed in the case closer to the second end than to the first end, and
the air hole is a through hole that is always open and an inside and outside of the case are in fluid communication via the air hole regardless of whether the battery is operating normally or abnormally.

2. The battery cover according to claim 1, wherein the single helical rib extends helically from the first housing portion toward the second housing portion.

3. The battery cover according to claim 1 further comprising a space ensuring part that is formed on an inner peripheral face of the first housing portion, to form a second space between an end face of the first housing portion and the positive terminal of the battery.

4. The battery cover according to claim 1 further comprising a plate member that is housed in the first housing portion, and covers the positive terminal of the battery.

5. The battery cover according to claim 1 further comprising:
an electrode plate having one end electrically connected to one of the positive terminal and the negative terminal of the battery; and
a groove that is formed inside the case, houses the electrode plate, and draws out another end of the electrode plate from the inside of the case to the outside of the case.

6. A battery pack comprising:
a plurality of the battery covers according to claim 1; and
a plurality of batteries electrically connected to one another, and respectively housed in the plurality of the battery covers.

7. The battery cover according to claim 2 further comprising a space ensuring part that is formed on an inner peripheral face of the first housing portion, to form a second space between an end face of the first housing portion and the positive terminal of the battery.

8. The battery cover according to claim 4 further comprising:
an electrode plate having one end electrically connected to one of the positive terminal and the negative terminal of the battery; and
a groove that is formed inside the case, houses the electrode plate, and draws out another end of the electrode plate from the inside of the case to the outside of the case.

9. A battery pack comprising:
a plurality of the battery covers according to claim 7; and
a plurality of batteries electrically connected to one another, and respectively housed in the plurality of the battery covers.

10. A battery pack comprising:
a plurality of the battery covers according to claim 8; and
a plurality of batteries electrically connected to one another, and respectively housed in the plurality of the battery covers.

11. The battery cover according to claim 1, wherein the air hole is disposed only in the second housing portion.

12. The battery pack according to claim 6, wherein the plurality of the battery covers are disposed in series along a longitudinal direction of the battery pack.

* * * * *